2,937,121

PRODUCTION OF L-THREONINE

Hsing T. Huang, Fresh Meadows, N.Y., assignor to Chas. Pfizer & Co., Inc., New York, N.Y., a corporation of Delaware No Drawing. Application March 10, 1958
Serial No. 720,003

3 Claims. (Cl. 195—47)

This invention is concerned with a fermentation process for the production of L-threonine. More particularly, it is concerned with the production of L-threonine by the cultivation of an *E. coli* mutant.

L-threonine is an essential amino acid which is useful in human nutrition, nutrition studies and also in the synthesis of peptides which is of considerable biological interest. L-threonine is also important in the preparation of artificial maple flavor as described in U.S. Patent 2,446,478 wherein is described a process for the preparation of artificial maple flavor by reaction of threonine with a suitable reducing saccharide or precursors thereof.

Although threonine may be prepared by chemical synthetic methods, numerous articles are found describing such methods. The synthetic product is generally a mixture of the diastereoisomers, D,L-threonine and D,L-allothreonine. The diastereoisomers must first be separated by fractional crystallization and additional chemical reactions applied to D,L-allothreonine to convert it to D,L-threonine. Finally, L-threonine is obtained from D,L-threonine by resolution methods familiar to those in the art. Davis has reported in Nature, vol. 169, page 534 (1952), that a diaminopimelic acid-requiring auxotroph of *E. coli* produced detectable amounts of L-threonine.

It has now been found that an auxotrophic mutant of *E. coli* which requires diaminopimelic acid for growth accumulates appreciable quantities of L-threonine when cultivated in certain nutrient media. A living culture of this single auxotroph of *E. coli* has been deposited in the American Type Culture Collection, Washington, D.C., where it has been assigned the number ATCC 13071. Such an auxotroph may be obtained by ultraviolet treatment followed by selection with penicillin of a wild strain of *E. coli*. This procedure is well known to those skilled in the art and commonly employed in the development and isolation of bacterial mutants.

The present invention provides an economical and practical method of preparing L-threonine, which is amenable to large scale commercial production for the essential amino acid. A major advantage of the present fermentation process lies in the fact that L-threonine is selectively produced thus avoiding the mixtures of optical isomers produced by the chemical synthetic route.

The process of the present invention is accomplished by the aerated, deep tank, i.e. submerged, fermentation of *E. coli*, ATCC 13071 in nutrient media. Such nutrient media usually comprise a carbon source, a source of nitrogen, and a source of metallic ions required for the organism's growth, for example, potassium and magnesium ions. The hexitols, mannitol and sorbitol, are found to be particularly suitable carbon sources, best results being obtained when they are employed. When glucose is used as the carbon source, extremely poor yields may be obtained.

As mentioned above, the single auxotroph of this invention requires diaminopimelic acid for its growth. By "diaminopimelic acid" as used in this disclosure and the claims appended thereto is meant the amino acid itself or its non-toxic acid addition salts, such as the hydrohalide salts, for example, the hydrochloride or hydrobromide. The organism accumulates optimum yields of L-threonine in the presence of from about 100 to about 140 mg. of diaminopimelic acid per liter of nutrient medium. Usually best results are obtained when employing from about 20 to about 30 g. of hexitol, for example, mannitol and sorbitol, per liter of nutrient medium. The use of other concentrations of hexitol may lead to reduced yield of L-threonine.

L-lysine is a particularly desirable ingredient of the fermentation medium. Its use, although not required for the production of L-threonine, results in increased yields of the essential amino acid. Up to 40 mg. of L-lysine per liter of nutrient medium is found to appreciably increase the yields, although it is preferred to employ from about 10 to about 40 mg. per liter of nutrient medium since best yields are so realized.

As is known in the art, the organism requires certain metallic ions for its growth, particularly potassium and magnesium ions which may be conveniently incorporated in the nutrient medium in the form of suitable soluble salts, for example, potassium acid phosphates and magnesium sulfate respectively. Various trace metals, for example, iron, cobalt, nickel, zinc and so forth are also required for the organism's growth and may be incorporated into the nutrient medium by the addition of a premix of a suitable soluble form of these ions or preferably by the use of tap water, which contains these required ions, for the preparation of the nutrient medium.

The fermentation may be carried out at any customary fermentation temperature, generally at a temperature of from about 20° to about 40° C. When sorbitol is employed as a carbon source in the nutrient medium, the fermentation is best carried out at a temperature of about 25° to about 30° C. where optimum yields are obtained. When mannitol is employed in the nutrient medium, a temperature of from about 35° to about 40° C. is found to give best results. With temperatures other than those specified, the yield is found to fall off appreciably.

The fermentation is usually effected at a pH of from about 6 to about 8. The medium is preferably aerated at a rate of from about ½ to 2 volumes of air per volume of medium per minute and stirred vigorously. The optimum time for the process may be conveniently determined by paper chromatographic analysis of the L-threonine content of the reaction mixture, a procedure which is commonly employed in fermentation processes. Generally, time periods of from about 24 to about 48 hours give best results.

After the reaction is complete, the fermentation mixture assays at from about 1 to 1.5 g. of L-threonine. The fermentation medium contains appreciable amounts of glycine, from about 0.2 to about 0.3 gram per liter, and small quantities of serine and glutamic acid, the concentration of the latter two being less than 0.2 g. per liter.

After the fermentation is complete, L-threonine may be isolated by standard procedures such as ion-exchange methods, for example, the L-threonine may be recovered by adjusting the pH of the medium to about 2 with hydrochloric acid, filtering and passing the filtrate through a strong cation exchange resin such as sulfonic acid resin, Amberlite IR–120 (Rohm and Haas Co.). After washing with water, the product is eluted with dilute ammonium hydroxide, the eluate freed of ammonia by heating and the pure amino acid obtained by fractional crystallization.

Alternatively, the product may be absorbed on a strong cation exchange resin such as sulfonic acid resin Permutit Q (The Permutit Co., a division of Pfaudler Permutit Inc.). The resin is then washed with dilute (0.1 to 0.5 molar) ammonium hydroxide, L-threonine being eluted first. The constituency of the eluate may be determined by paper chromatographic analysis and the cuts containing threonine concentrated and crystallized. The remaining cuts contain glycine, serine and glutamic acid which may then be obtained by concentration and crystallization.

L-threonine as obtained from the fermentation medium is characterized by paper chromatography, specific rotation and microbiological analysis with *Leuconostoc mesenteroides* P-60 by standard procedures described in the literature, for example, "The Microbiological Assay of Vitamin B Complex and Amino Acids" by F. C. Barton Wright, Pitman & Sons, London (1952).

The following examples are given by way of illustration and are not to be construed as limitations of this invention, many variations of which are possible within the scope and spirit thereof.

*Example I*

E. coli, ATCC 13071 was inoculated from an agar slant into 1 liter of an inoculum previously sterilized at 20 pounds/square inch for 30 minutes having the following composition:

| | | |
|---|---|---|
| $K_2HPO_4$ | g./l | 7 |
| $KH_2PO_4$ | g./l | 3 |
| Trisodium citrate | g./l | 0.4 |
| $MgSO_4.7H_2O$ | g./l | 0.1 |
| $(NH_4)_2SO_4$ | g./l | 0.1 |
| Glucose (sterilized separately) | g./l | 10 |
| Diaminopimelic acid (hydrochloride) | mg./l | 20 |
| L-lysine | mg./l | 20 |

The inoculum was incubated for 16 hours at 27° C. in a Fernbach flask. A production medium was prepared having the following composition:

| | | |
|---|---|---|
| $K_2HPO_4$ | g./l | 7 |
| $(NH_4)_2HPO_4$ | g./l | 13 |
| $(NH_4)_2SO_4$ | g./l | 1.5 |
| $MgSO_4/7H_2O$ | g./l | 0.1 |
| L-lysine (hydrochloride) | mg./l | 40 |
| Diaminopimelic acid | mg./l | 140 |
| Mannitol | g./l | 30 | pH adjusted to 7.8 with ammonium hydroxide.

Fifty milliliters of the inoculum was added to 2 liters of the production medium in a fermenter flask previously sterilized by autoclaving at 20 pounds/square inch for 35 minutes. The broth was stirred at 1750 revolutions/minute and aerated at a rate of 1 volume of air per volume of reaction medium per minute at a temperature of 35° C. After 28 hours, the mixture assayed at 1.5 grams per liter of L-threonine which was isolated by ion exchange treatment.

*Example II*

E. coli, ATCC 13071 was inoculated from an agar slant slant into 1 liter of an inoculum as described in Example I.

A production medium was prepared having the following composition:

| | | |
|---|---|---|
| $K_2HPO_4$ | g./l | 7 |
| $KH_2PO_4$ | g./l | 3 |
| $(NH_4)_2HPO_4$ | g./l | 13 |
| $MgSO_4.7H_2O$ | g./l | 0.1 |
| $(NH_4)_2SO_4$ | g./l | 1 |
| L-lysine (hydrochloride) | mg./l | 20 |
| Diaminopimelic acid | mg./l | 100 |
| Mannitol | g./l | 20 | pH was adjusted to 7 with ammonium hydroxide.

The mixture was stirred and aerate as in Example I at 40° C. After 32 hours, the mixture assayed at 1.5 grams per liter of L-threonine which was obtained by ion exchange treatment.

*Example III*

The procedure of Example I was repeated employing 30 g./l. of mannitol with comparable results.

*Example IV*

The procedure of Example I was repeated with sorbitol in place of mannitol at 27° C. After 48 hours, the mixture assayed at 1 gram per liter L-threonine which was obtained by ion-exchange treatment.

*Example V*

The procedure of Example II was repeated employing 30 g. of sorbitol in place of mannitol at 27° C. for 48 hours with comparable results.

*Example VI*

The procedure of Example I was repeated with the exception that no lysine was added to the nutrient medium. After 28 hours, the mixture assayed at 1.2 grams per liter of L-threonine.

What is claimed is:

1. A process for the preparation of L-threonine which process comprises cultivating, under submerged aerobic conditions, at a pH of from about 6 to about 8, E. coli, ATCC 13071 in an aqueous nutrient medium comprising a hexitol selected from the group consisting of corbitol and mannitol, a source of nitrogen, a source of magnesium, a source of potassium, and trace metals in the presence of from about 100 to 140 mg. of diaminopimelic acid per liter of nutrient medium, when sorbitol is used at a temperature of from about 25° to about 30° C., when mannitol is used, at a temperature of from about 35° to about 40° C.

2. A process as claimed in claim 1 wherein from about 10 to about 40 milligrams of L-lysine per liter of nutrient medium is added.

3. A process as claimed in claim 1 wherein from about 20 to about 30 grams of hexitol per liter of nutrient medium is employed.

References Cited in the file of this patent

UNITED STATES PATENTS 2,771,396    Casida    Nov. 20, 1956

OTHER REFERENCES

Nature, vol. 169, pp. 534 to 536 (1952).
Journal of Bacteriology, vol. 67, pp. 182 to 190 (1954).